3,300,316
METHOD OF PREPARING FRUIT PIES
Noel R. Cooper, William C. Hurley, David E. Larkin, and James O. Mavis, Greenville, Ill., and John W. Jones, St. Louis, Mo., assignors to Pet Milk Company, St. Louis, Mo., a corporation of Delaware
Filed Jan. 20, 1964, Ser. No. 338,742
6 Claims. (Cl. 99—92)

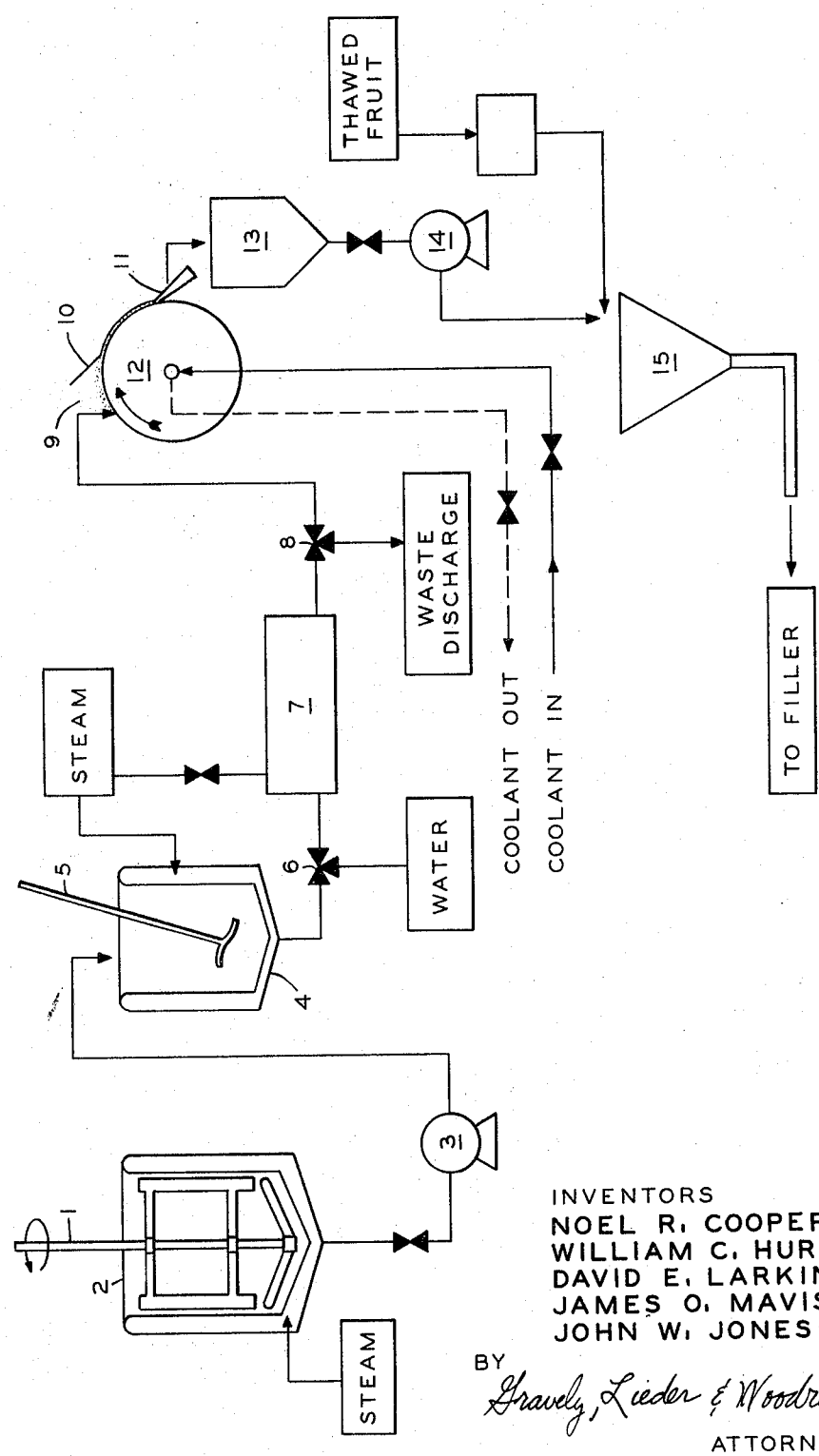

This invention relates to pie fillings and related products, and in particular to a method of making fruit pie fillings by continuous cooking of the starch, cooling the same, and adding it to partially thawed frozen fruits.

Heretofore, when pie fillings, particularly fillings for frozen fruit pies, were prepared, the fruit juices had to be drained from the thawed fruit, starch and sugar were added to the juice portion, and the mixture was cooked to gelatinize the starch. The hot gummy mass than was added to the thawed fruit, and the entire filling was re-frozen in a pie shell. Pies prepared according to this process required almost an hour of baking time and the color and taste of the fruit were inferior.

In the present invention, applicants prepare a starch slurry to which sugar, corn syrup, flavorings, coloring and spices with or without added acid are added, and the slurry is cooked until 70–98% of the starch granules are hydrated as desired. Starch hydration is determined by microscopy. The starch slurry then is rapidly cooked without disrupting the swollen starch granules and added to partially thawed frozen fruit (including the fruit juices) and the mixture in turn is then added to pie shells, and frozen therein.

The present invention results in products which can be baked in 30–35 minutes with marked improvement in the taste and quality of the finished pie product. The fruit flavors and juices are not cooked out, but retain their peak freshness. The fruit integrity and appearance are maintained which results in a more tempting appearance. The new pies do not have a tendency to boil over in baking.

Accordingly, one of the principal objects of the present invention is to provide a method of making frozen pies which have short baking times and in which the fruit filling is more pleasing in taste and appearance.

Another object of the present invention is to provide a method of making pie and pastry fillings wherein the fruit juices are not separated from the fruit during the processing.

A further object of the present invention is to provide a method of making frozen fruit fillings for pies and pastries wherein a swollen starch slurry is mixed with the fruit and its juice at temperatures of 20–30° F.

Another principal object of the present invention is to provide a continuous starch cooking method including the cooling of the starch slurry to a temperature below the hydration point of the starch without shattering the partially or completely gelatinized starch granules.

Another object of the present invention is to provide a method of making a frozen fruit pie without completely thawing and/or draining the frozen fruits before adding the cooked cooled starch slurry.

A further object of the present invention is to provide a method of making frozen fruit pies in which the temperature of the fruit product is decreased at the time of filling into the pie shell with a resultant increase in production rates due to decreased heat loads on the freezer.

Another principal object of the present invention is to provide a method of continuously cooking a starch slurry and cooling the same to temperatures well below the hydration point of the starch being used without shattering the partially or fully gelatinized starch granules.

The final product provides the following unique benefits to the consumer:

(1) A home preparation time approximately one-half as long as present products.

(2) Improved fruit quality by virtue of (a) plumper and improved appearance of fruit, (b) fresher more natural fruit flavor, (c) higher percentage of washed fruit weight.

(3) Complete elimination of boil-out.

Other objects and advantages will become apparent hereinafter.

The present invention comprises a method of continuously cooking slurries containing food grade starches to a given degree of gelatinization and cooling the starch to a desired temperature without shattering the starch granules. The cooled gelatinized starch is then added to partially or completely thawed fruit at a predetermined ratio of cooked starch to fruit to obtain a desired filling viscosity as well as proper blend of filling. The blended fruit and cooked starch is immediately ready to be made into finished pies or pastries which can either be frozen or baked at time of filling.

The figure is a schematic flow diagram of the apparatus and process.

The following example shows a specific preferred process of the present invention.

A starch slurry is made up of approximately 68% total solids consisting of 31% water, 46% granulated sugar, 15% corn syrup, .06% added acid, 8% starch granules, and artificial coloring. The slurry may have from 1–80% solids. This slurry is then pre-heated in a steam jacketed kettle to 120° F. to give a uniform cook as well as control the amount of moisture pick-up on steam jet cooking of the slurry. The pre-warmed slurry is passed through a steam injector type cooker and cooked to a temperature of 192–240° F., preferably about 211° F., at which point the starch granules are approximately 70–98% hydrated, preferably 85–95% hydrated. The hot cooked starch at approximately 240° F. is deposited from the discharge end of the cooker onto a revolving stainless steel drum cooler. A spreading device approximately ⅛ inch off the surface of the drum, spreads the cooked starch uniformly across the surface of the drum. Refrigerated water of approximately 34° F. is circulated through the drum to cool the cooked starch to approximately 140° F., which is below the gelatinization point of food starch used. The drum surface temperature may be 32–50° F. The drum cooler is equipped with a plastic wiper blade to scrape the cooled starch from the surface of the drum. The cooled starch is added directly to partially thawed frozen fruits of approximately 20–30° F. The cooked starch slurry and fruit are mixed in ratios of about 32:68 to 66:34 by weight of cooked starch slurry to fruit. The fruit filling (including the starch) is mixed thoroughly, and made into complete pastries, including pies, and frozen. The pastries may be baked at 450–475° F. for about 30 minutes.

An arrangement of equipment for carrying out the cooking and cooling of starch slurries for pie or pastry fillings is shown in the attached schematic flow diagram.

A steam jacketed mixing kettle 2 is used to heat the slurry to the desired temperature; steam or water may be used as the heating medium. A variable speed motor is used in the kettle 2 to operate the wipe surface type mixer 1 at sufficient speed to keep the slurry ingredients in proper suspension. An alternate mixing tank may be incorporated prior to the kettle 2 to insure a continuous, uniform, uninterrupted flow to the system. The slurry may be heated to any given temperature below the hydration point of starch used. Preheating of the slurry dissolves the soluble solids materials used in the slurry and aids in pumping and handling of the slurry through the system. The optimum slurry preheating range is 100° F.–140° F.; however, much lower temperatures from approximately 50° F. and temperatures as high as 186° F., depending on elevation and hydration point of starch used, may be used. Preferably, slurries of 76% soluble solids are heated to 140° F. for ease of pumping and cooking, but higher preheat temperatures could be used.

A positive type pump 3 is used to pump the warmed or hot slurry to the surge tank 4. The surge tank 4 is used to insure a uniform flow of slurry to the cooker. The surge tank 4 is equipped with an agitator 5 and with or without a recirculating pump to keep the slurry in homogenous suspension. The surge tank 4 also is equipped with a steam jacket which can be used with steam or water to maintain the slurry at a constant temperature. The uniformity of moisture pick-up during the cooking process and ease of controlling the cook depends on the uniform temperature of the slurry to the cooker. An alternate system could be incorporated by using a pressure relief valve instead of the surge tank 4 and by-passing the excess slurry back to the mixing or holding kettle 2; thereby, supplying a constant flow of slurry to the cooker. The slurry is pumped through a steam injector type cooker 7 and cooked to a temperature at which point the starch granules are approximately 70–98% hydrated. The starch cooker 7 can be controlled by means of pressure relief valves to cook above atmospheric pressure and control valves for regulating the steam flow or temperature to obtain any degree of hydration of the starch granules desired. The temperature required to cook the slurry through the steam injector 7 depends on the solids content of the slurry and the degree of starch hydration desired. A starch slurry of approximately 68% soluble solids requires a cook temperature of approximately 240° F. to obtain the desired hydration of approximately 85–95%.

The temperature of cook and degree of hydration can also be controlled by the length and size of pipe from the cooker 7 to the discharge 9. Slurries of high solids content require a high cook temperature for adequate hydration of the starch. Slurries of high solids content also require a longer holding line after the cooker 7 to give a uniform hydration of all starch granules. The I.D. size of the pipe from the cooker to the discharge 9 must be held to a minimum to insure proper velocity of the cooked starch through the pipe and prevent gumming or adhering of the starch on the inside walls of the pipe.

The cooked starch of approximately 211° F., depending on cook temperature, is deposited onto a revolving stainless steel drum cooler 12. A spreading device 10, approximately ⅛ inch off the surface of the drum, spreads the cooked starch uniformly across the surface of the drum. By adjusting the spreading device 10 to any given angle or distance from the drum surface, the rate of cooling the cooked starch can be controlled to any given temperature desired at the wiper blade 11. The starch can be spread in a layer anywhere from about ⅛ to ½ inch thickness. The revolving drum containing refrigerated water or similar coolant of approximately 34° F., cooled the cooked starch to approximately 140° F. or lower depending on amount of surface cooler used and temperature of coolant. The drum cooler 12 is equipped with a wiper blade 11 to scrape the cooled starch from the surface of the drum.

An internal swept surface type of heat exchanger can also be used instead of the drum cooler or heat exchanger 12. In the internal swept surface type of heat exchanger, the cooked starch is forced uniformly through a thin space between the inside surface of the coolant barrel and the dasher with attached plastic wiper blades. The internal type of heat exchanger has controlled speed to prevent physical damage to the hydrated starch granules. It has been found that excessive speeds of 60–80 r.p.m. causes shattering or breaking of the starch granules as determined by microscopy. The optimum operating range for the internal swept surface type of cooler is 24 to 48 r.p.m.'s. The cooled cooked starch slurry is collected in a holding tank or surge tank 13 before being pumped directly to the mixing hopper 15. The cooled cooked starch slurry is metered through a pump 14 to the hopper 15 at a predetermined given rate for the amount of fruit being dumped. On internal wipe surface type of heat exchanger, the cooked cooled starch slurry may be metered from discharge end of exchanger directly into hopper 15. For example, a pie or pastry filling requiring 50% straight pack fruit requires 50 pounds of fruit for each 50 pounds of cooked starch slurry.

The cooled starch slurry having been mixed in proper proportions with the fruit, is then pumped to the filling operation to be filled into pastry shells and made into completed pies or pastries, which can be frozen or baked immediately.

In a continuous operation, it is essential to have a surge tank or constant flow of starch slurry prior to the starch cooker to maintain a uniform flow of slurry to the cooker. It is essential to pre-warm starch slurries having total solids of approximately 40% and higher. This pre-warming to approximately 100° F. aids in maintaining a more uniform cook and moisture pick-up in the process of cooking the starch. It is necessary to raise the pre-warming temperature to approximately 140° F. in starch slurries of approximately 70% total solids and higher. The cooling of the cooked starch is the most critical step in the entire process. Conventional methods of cooling this type of product, such as conventional wipe surface types of ice cream freezers, cause physical damage to the starch granules unless the speed is controlled. In passing through a conventional wipe surface type of freezer, the granules are shattered to such an extent that they have no water holding capacity, either in or between the swollen granules. In the present invention, a plastic blade, such as Teflon, on a revolving cold surface drum type of cooler, causes no shattering of the swollen starch granules. This type of cooling gives almost immediate retardation of the hydration of the starch granules, thereby lending itself to a uniform gelatinization of the starch mass.

In the final mixing of the cooled starch with the partially defrosted frozen fruit, the degree of gelatinization of the starch mass produces variations in the viscosity of the final mix. Starch granules that are only approximately 60–70% or less hydrated, produce a thin undesirable filling for present-day high speed type of filling operations. However, cooked starches with a full degree of hydration of the starch granules, cause small beads or lumps of cooked starch that do not dissipate and make a uniform blend with the fruit and juices. Therefore a degree of hydration or gelatinization of 85–95% is preferred.

A big advantage of the present mixing method is the fact there is no limitation as to temperature of final mix, so long as the cooked starch and fruit can be blended together. Any predetermined final mix temperature can be obtained by altering the degree of cooling the cooked starch slurry as long as the temperature is below the hydration point of the starch and at the same time altering the degree of defrost of the frozen fruit used.

The nature of this type of mixing pie or pastry type fillings lends itself well to the production of frozen as well as baked pies or pastries. A pie or pastry filling made by this method can be made into finished products which require only a minimum of baking. Pies of excellent quality have been made from this method of mixing pie filling by baking the frozen pie for approximately 30 minutes at temperatures of 450–475° F. This technique of baking pies at high temperatures for short periods of time increases the overall quality of the pie by giving plumper fruit, less boil-out during baking, higher washed fruit percentage and a higher degree of fresh fruit flavor and color.

Starches having the following characteristics are suitable for use in the present invention:

(1) A starch which cooks to a medium, cohesive, clear gel which does not change on cooling;

(2) A starch which has gel stability and does not reverse on cooling, freezing, and subsequent re-thawing;

(3) A starch which aids in reducing syneresis due to its polymer properties;

(4) A starch which is compatible with other ingredients and fruit acids;

(5) A starch which produces sols that are bland and odorless;

(6) A starch which when cooked has smooth and soft texture and results in good mouth feel; and (7) A starch which is resistant to mechanical shear agitation.

A phosphated, modified, waxy, maize starch made by American Maize Products Co. and sold under the name "Waxy Maize Starch 400 Stabilizer" is suitable for use in this invention. Other suitable standard items of commerce include a product sold under the name "Clear-Jel" by National Starch and Chemical Corporation, and a product sold by A. E. Staley Manufacturing Company under the name "Mira-Cleer." Other starches which have the foregoing characteristics are readily available from starch manufacturers, and also are readily compounded to order when the desired functional characteristics are known.

This invention is intended to cover all changes and modifications of the examples of the invention herein chosen for purposes of the disclosure, which do not constitute departures from the spirit and scope of the invention.

What is claimed is:

1. A process of making fruit pies comprising the steps of preparing an acidic aqueous slurry of starch, sugar, corn syrup, flavoring, coloring and spices, preheating the slurry to a temperature of about 50–186° F., cooking the starch slurry at a temperature of about 192–240° F. for a period of time sufficient to hydrate 70–98% of the starch granules, spreading the cooked starch slurry on a cooled surface in a layer about ⅛ inch thick, scraping the cooled slurry from said surface after cooling by scraping with a wiped surface type plastic blade without physical shear damage to the swollen hydrated starch granules, mixing the cooled cooked starch slurry with frozen fruits, at least a portion of which is defrosted, including the fruit juice, and filling the combined starch slurry and fruit into pie shells.

2. A process of making fruit pies comprising the steps of preparing an acidic aqueous slurry of starch, sugar, corn syrup, flavoring, coloring and spices, preheating the slurry to a temperature of about 50–186° F., cooking the starch slurry at a temperature of about 192–240° F. for a period of time sufficient to hydrate 70–98% of the starch granules, cooling the cooked starch slurry in an internal swept surface type of heat exchanger using controlled wiper blade speed of about 24 to about 48 r.p.m. to prevent physical shear damage to the hydrated starch granules, mixing the cooled cooked starch slurry with frozen fruits, at least a portion of which is defrosted, including the fruit juice, and filling the combined starch slurry and fruit into pie shells.

3. A process of making fruit pies comprising the steps of preparing an aqueous slurry comprising starch, sugar and corn syrup of about 1–80% total solids, preheating the slurry to a temperature of about 50–186° F., cooking the slurry at a temperature of about 192–240° F. for a period of time sufficient to cause about 85–95% hydration of the starch granules, spreading the cooked slurry on a cooled surface having a temperature of about 32–50° F. in a layer about ⅛ inch thick, cooling the slurry to less than about 140° F., scraping the cooled slurry from the surface with a wiper blade without shattering the starch granules, mixing the cooled cooked slurry with partially thawed fruits including the fruit juice in about a 32:68 to 66:30 ratio by weight of cooked starch slurry to fruit, and filling the combined starch and fruit into pie shells.

4. A process of continuously making a fruit pastry filling comprising the steps of preparing an aqueous slurry comprising starch, sugar and corn syrup of about 1–80% total solids, preheating the slurry to a temperature of about 50–186° F., cooking the slurry at a temperature of about 192° F. to about 240° F. for a period of time sufficient to cause about 70–98% hydration of the starch granules, spreading the hot cooked slurry on a cool surface in a layer about ⅛ to ½ inch thick, cooling the starch to less than about 140° F. to retard hydration of the starch granules, scraping cooled starch from the surface with a wiper blade without shattering the starch granules, and mixing the cooled cooked starch slurry with at least partially defrosted frozen fruits including the fruit juice.

5. The process of claim 4 wherein the starch is hydrated to 85–95%.

6. A process of making pastry comprising the steps of preparing an aqueous slurry comprising starch, sugar and corn syrup of about 1–80% total solids, preheating the slurry to a temperature of about 50–186° F., cooking the slurry at a temperature of about 192° F. to about 240° F. for a period of time sufficient to cause about 70–98% hydration of the starch granules, spreading the hot cooked slurry on a cool surface in a layer about ⅛ to ½ inch thick, cooling the starch to less than about 140° F. to retard hydration of the starch granules, scraping cooled starch from the surface with a wiper blade without shattering the starch granules, and mixing the cooled cooked starch slurry with at least partially defrosted frozen fruits including the fruit juice, and filling the combined cooked starch slurry and fruit into pastry shells.

References Cited by the Examiner

UNITED STATES PATENTS

| | | | |
|---|---|---|---|
| 2,248,289 | 7/1941 | Thal | 99—92 |
| 2,406,585 | 8/1946 | Buchanan et al. | 99—92 |
| 2,442,658 | 1/1948 | Lloyd | 99—92 X |
| 2,563,996 | 8/1951 | Edgar | 99—139 |
| 2,852,393 | 9/1958 | Kerr | 9—139 |

RAYMOND N. JONES, *Acting Primary Examiner.*

A. LOUIS MONACELL, *Examiner.*